Jan. 26, 1971  R. R. BURCH ET AL  3,559,013
COMMUTATION OVERLAP CONTROL FOR BRUSHLESS D.C. MOTOR
Filed July 23, 1969  3 Sheets-Sheet 1

INVENTORS
RAY R. BURCH
WILLIAM M. CASADAY
BY
ATTORNEY

United States Patent Office 3,559,013
Patented Jan. 26, 1971

3,559,013
COMMUTATION OVERLAP CONTROL FOR BRUSHLESS D.C. MOTOR
Ray R. Burch and William M. Casaday, Charlottesville, Va., assignors to Sperry Rand Corporation, a corporation of Delaware
Filed July 23, 1969, Ser. No. 844,126
Int. Cl. H02k 29/00
U.S. Cl. 318—138                                                   9 Claims

ABSTRACT OF THE DISCLOSURE

An improved steering circuit for an optically commutated brushless D.C. motor of the type in which a plurality of optical sensors are arranged so as to be sequentially illuminated as the rotor rotates. The steering circuit contains an individual switching stage for energizing each stator winding in response to the output of a given one of the optical sensors. Each sensor is coupled to the input of one swtiching stage but energized through a coupling network from an adjacent stage.

BACKGROUND OF THE INVENTION

(1) Field of the invention

This invention relates to brushless D.C. motors and more particularly to steering circuits for light-actuated brushless D.C. motors using a plurality of sensing elements.

(2) Description of the prior art

Light-actuated brushless D.C. motors are known in the art. These motors employ a permanently magnetized rotor rotatable in response to the magnetization of appropriate stator coils.

The prior art motors of this type employ a certain amount of overlap in that one stator winding is energized before the previously energized stator winding is de-energized.

This overlap is necessary to assure that the motor will start regardless of the position at which the rotor has come to rest.

The operation of these motors is dependent upon the accuracy of the spacing angle between the sensors, the width of the aperture in a light shield that forms the beam necessary to illuminate the various sensors, the light acceptance angle and current gain of the sensors and the light output of the light source.

Variations in one or more of these items causes the conduction angle of each switching means to differ and to cause the amount of overlap to vary between the individual switches. For these reasons, prior art motors are sensitive to ambient conditions and require extremely precise alignment during construction.

SUMMARY OF THE INVENTION

Commutation overlap in a light-actuated brushless D.C. motor is controlled by means of individual switching circuits that are intercoupled to prevent current flow through more than one stator winding at any one time.

DESCRIPTION OF THE PREFERRED EMBODIMENT

Figure 1:
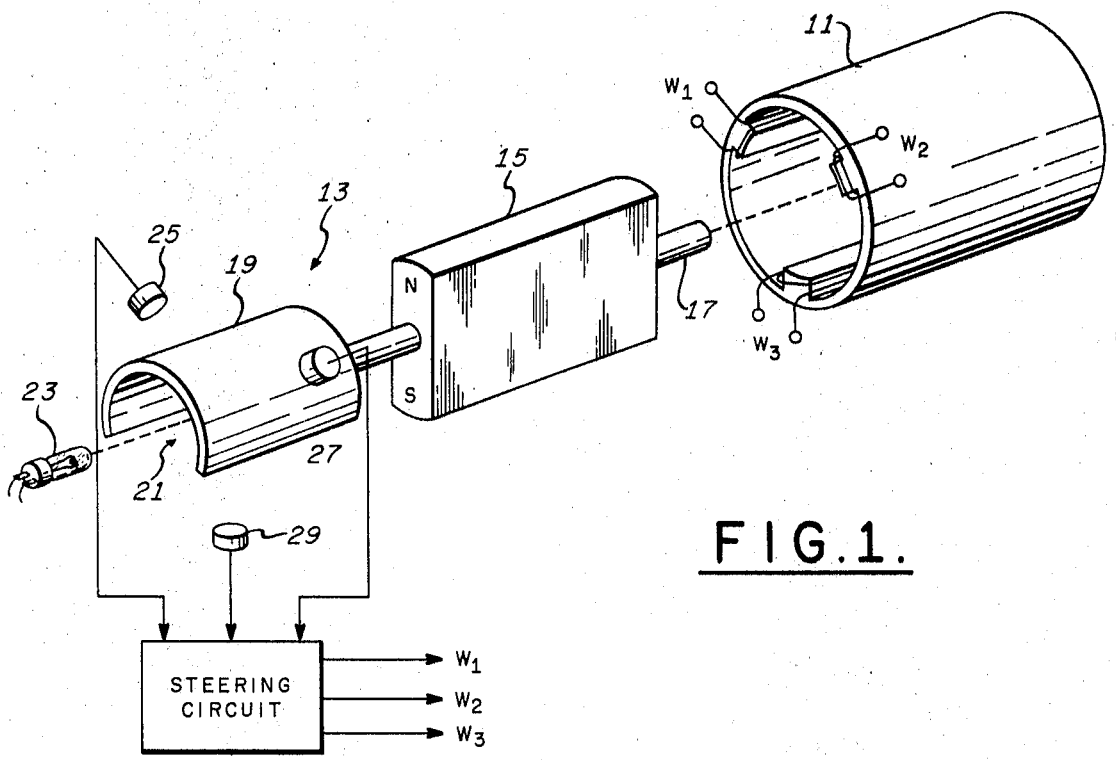
FIG. 1 is a perspective view of a typical light-actuated motor that may employ the principles of the present invention.

A motor of the type that may utilize the present invention is depicted in FIG. 1. This particular figure illustrates a Y-connected three-segment brushless D.C. motor. A housing 11 contains three stator windings $W_1$, $W_2$ and $W_3$, respectively. A permanently-magnetized rotor 13 contains a permanent magnet 15 mounted on a shaft 17. The stator windings are wound in such a direction that, when energized, they will attract the same magnetic pole of the permanent magnet 15. A light shield 19 is mounted integrally on the shaft 17. The shield 19 is opaque except for an aperture 21.

When the motor is assembled, a light source 23 is inserted within the shield. Light from the source is formed into a beam as it passes through the aperture 21. A plurality of optical sensors 25, 27 and 29 are disposed at equal distances around the shield 19. As the rotor rotates, the light beam from the aperture in the shield 19 traverses the various optical sensors in a cyclical sequence. The electrical output from the various sensors is amplified and steered to appropriate stator windings so as to maintain rotation of the rotor. The electrical steering circuit for performing this function is the subject of the present invention and will be described in detail.

Figure 2:
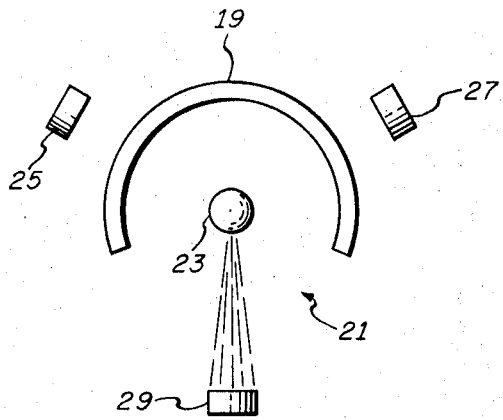
FIG. 2 is a schematic diagram useful in explaining the overlap phenomenon in such motors.

FIG. 2 illustrates schematically, the operation of the optical commutator. The light source 23 positioned in the shield 19 can reach the optical sensors 25, 27 and 29 only through the aperture 21. The aperture 21 must be sufficiently wide so that the light emanating from the shield 19 forms a beam that has an angular width greater than the angle between adjacent sensors. Thus, as the shield rotates, there are certain intervals during each revolution when two adjacent sensors are illuminated. If this were not so, the rotor could come to rest at a position where a narrow beam of light was directed between adjacent sensors. Since none of the sensors would be illuminated when an attempt was made to start the motor, none of the intervening switching circuits woud be actuated and none of the stator windings would be energized. The motor would fail to start.

Prior art motors have used a wide aperture, producing a certain amount of overlap, to avoid this condition.

Figure 3:
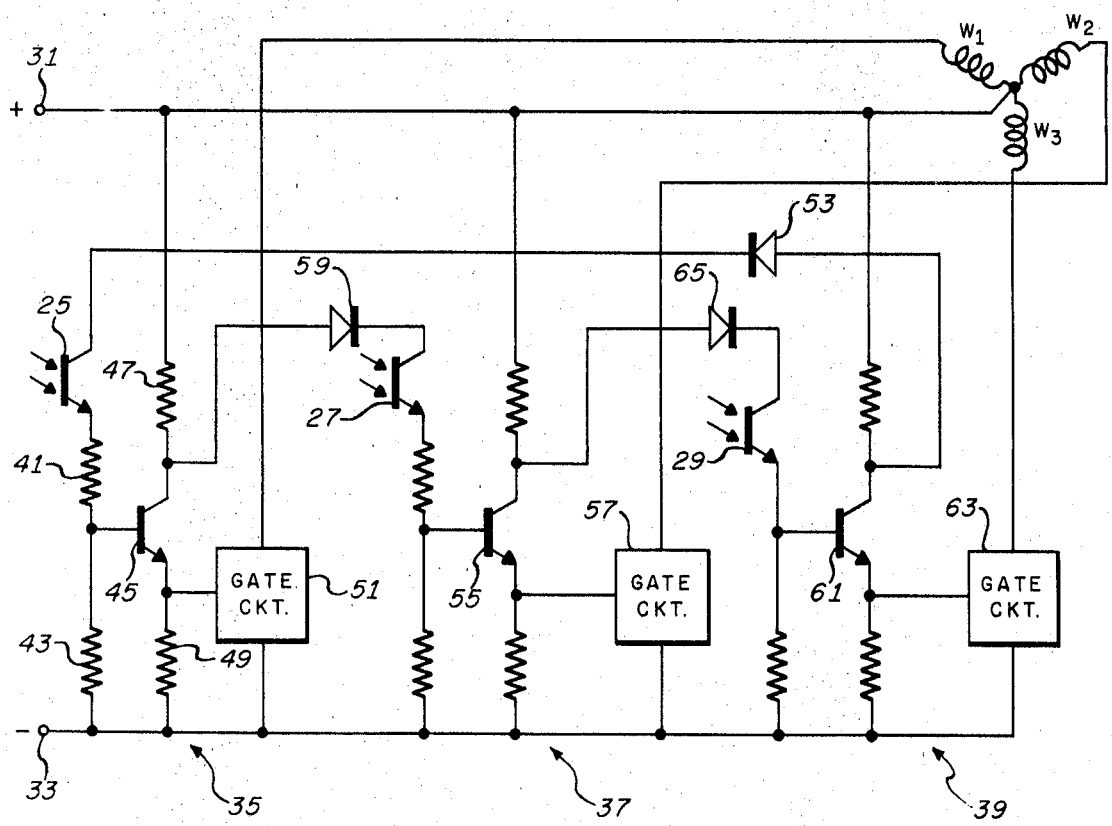
FIG. 3 is a circuit diagram illustrating a steering circuit utilizing the principles of the present invention.

The present invention uses a wide aperture as taught in the prior art but overcomes the problems of the prior art by means of a steering circuit such as that illustrated in FIG. 3.

The steering circuit of FIG. 3 is intended for use with the motor of the type illustrated in FIG. 1. Three stator windings $W_1$, $W_2$ and $W_3$ must be energized in that order to sustain clockwise revolution of the rotor. The motor is energized through a positive bus 31 and a negative bus 33. The three optical sensors 25, 27 and 29 are used to drive corresponding switching stages 35, 37 and 39, respectively.

The optical sensor 25 is connected through first and second emitter resistors 41 and 43 to the negative bus 33. The junction of these two resistors is connected to the base of an npn transistor 45. The transistor is connected to the positive bus 31 through a collector resistance means 47. The emitter of the transistor 45 is connected to the negative bus through an emitter resistor 49. The transistor 45 and its associated circuits constitutes a preamplifier that raises the electrical output of the optical sensor 25 to a level suitable for driving a conventional gate circuit 51. The gate circuit is arranged to connect the stator winding $W_1$ to the negative bus 33 when the sensor 25 is illuminated. The various resistors associated with the transistor 45 are proportioned so that when the optical sensor 25 is dark, the transistor 45 is biased to cut-off and when the sensor 25 is illuminated, the transistor 45 is saturated.

Thus the preamplifier acts as a bistable means to produce high and low voltages in response to received illumination.

Voltage is applied to the optical sensor 25 from a similar preamplifier in the switching stage 39 through a diode 53. The switching stages 37 and 39 are each constructed in the same manner as the switching stage 35.

Assume that the circuit of FIG. 3 is to provide clockwise rotation of the permanent magnet rotor. Assume further, that the rotor is at a position such that the optical sensor 25 is illuminated but the sensors 27 and 29 are dark. Under these conditions, the sensor 25 will draw current through the diode 53 and the collector-resistor for the transistor 61 in a stage 39. The current through the sensor 25 will saturate transistor 45 and the collector voltage on the transistor 45 will drop to a level sufficiently low to prevent current flow through the diode 59 and the sensor 27 regardless of the illumination of the sensor 27. Thus, the gate 51 will be turned on so that the winding $W_1$ will be energized and the gate 57 will be inhibited. As the rotor rotates, a point will be reached where the sensor 27 will be illuminated before the sensor 25 becomes darkened. When this occurs, the transistor 45 will still be saturated by current through the sensor 25 so that no voltage is applied to the sensor 27 and the gate 57 cannot be turned on. Eventually, the rotor will rotate to a position such that the sensor 25 becomes darkened. At this time, current flow through the sensor 25 will cease, but the transistor 45 will turn off and close the gate 51. The collector voltage on the transistor 45 will rise and energize the sensor 27 through the diode 59. Current will flow through the sensor 27, saturate the transistor 55, and turn on the gate 57, which energizes the winding $W_2$. The energization of winding $W_2$ will cause the rotor to continue in the clockwise direction.

The switching stages are arranged in a predetermined order to sustain the desired direction of rotation. Thus, as the rotor continues to rotate, the sensors 25, 27 and 29 are illuminated in that order so that the corresponding stator windings $W_1$, $W_2$ and $W_3$ are energized in the proper cyclical sequence.

During each interval in which two adjacent sensors are illuminated, the switching stage associated with the second of these sensors will be prevented from supplying current to the corresponding stator winding until the first of these sensors becomes darkened.

In general, the interstage sensor coupling circuit serves as a disabling means. During normal operation, illumination of a sensor in one stage disables the following stage.

In the event that two adjacent optical sensors are both illuminated when the motor is to be started, the steering circuit will operate to switch current exclusively to the stator winding that would ordinarily be the first winding to be energized in the desired cyclical sequence. Thus, with clockwise rotation, if the rotor came to rest at a position so that sensors 27 and 29 were both illuminated when power was restored, the current flow through the sensor 27 could be established since this sensor is energized from the stage 35 associated with the dark sensor 25. The resulting signal from the sensor 27 would drive the transistor 55 of stage 37 toward saturation. This would quickly lower the voltage applied to the sensor 29 so that this sensor would be unable to turn on the gate 63. Only stator winding $W_2$ would become energized and the rotor would commence rotating in the clockwise direction.

The overlap between the switching stages is held to a minimum by employing the steering circuit of the invention, without a corresponding sacrifice in efficiency.

By using the overlap control of the present invention, precise matching of components is not required. Trial and error assembly and testing is made unnecessary since the need for precision alignment of the aperture is eliminated.

Furthermore, the invention maintains the overlap relatively constant regardless of temperature variations since the overlap is no longer dependent upon purely mechanical relationships.

Figure 4:
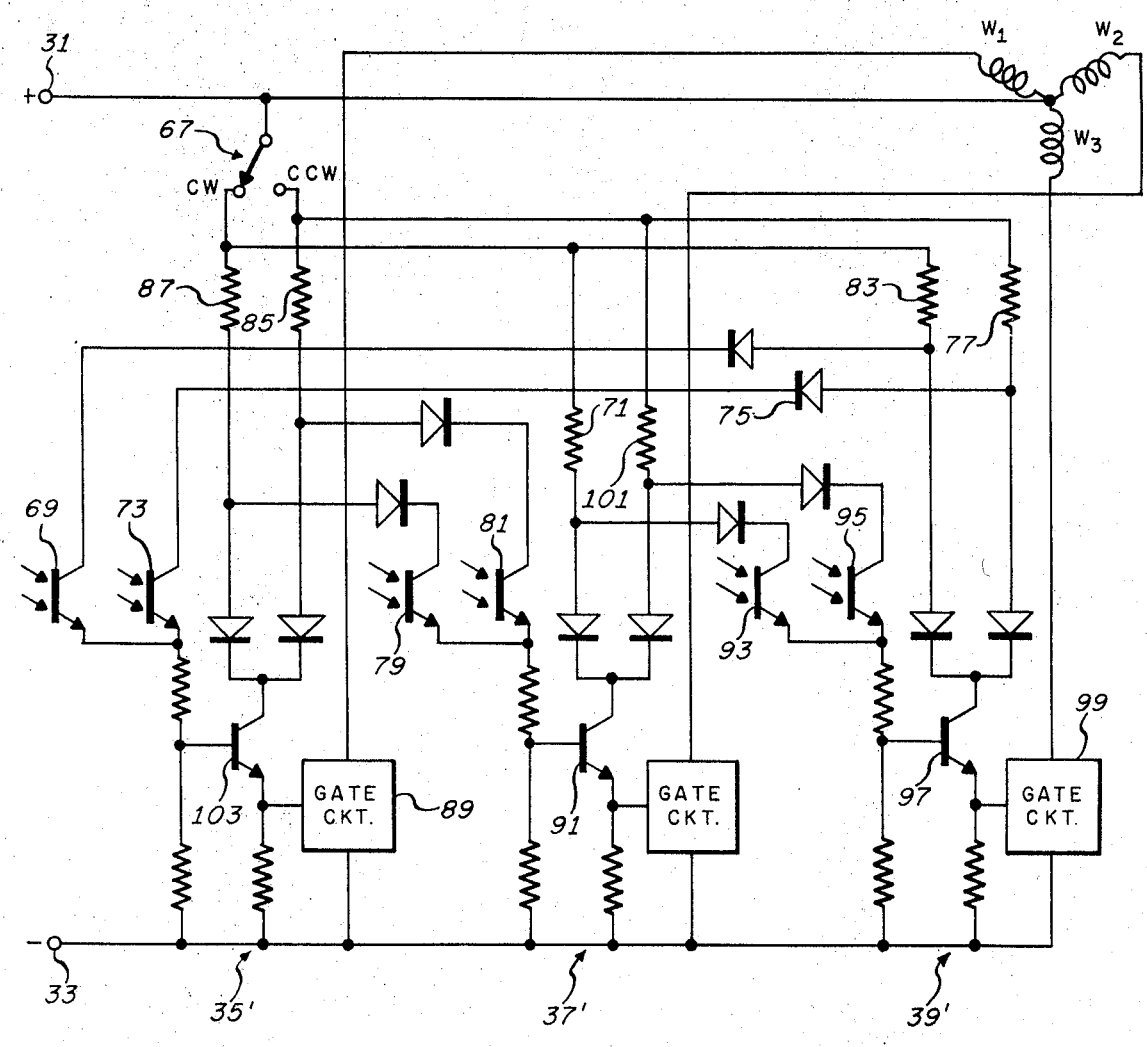
FIG. 4 is a circuit diagram illustrating a steering circuit capable of providing rotation in either direction according to the principles of the present invention.

The circuit of FIG. 4 is similar to that of FIG. 3. However, provision in this circuit has been made for reversing the direction of rotation through a reversing switch 67.

The stator windings $W_1$, $W_2$ and $W_3$ are again energized through switching stages 35', 37' and 39'.

In the circuit of FIG. 4, pairs of photocells are used in each sensing means. The preamplifier also contains pairs of collector resistors connected so that one or the other of these resistors is connected to the positive bus 31 as determined by the position of the dual position reversing switch 67.

The collector resistors are connected to the transistors in each preamplifier circuit through isolating diodes.

In the switching stage 35', a first photocell 69 may be energized through a collector resistor 83 in the stage 39' when the switch 67 is closed in the clockwise direction. When the switch 67 is closed in the counterclockwise position, a second photocell 73 in the sensing means of stage 35' may be energized through a diode 75 and the collector resistor 77 in the stage 39'. Similarly, photocell 79 or 81 in the switching stage 37' may be energized through the collector resistor 87 in the stage 35' or the collector resistor 85 in the switching stage 35', respectively.

Assume that clockwise rotation is desired. The switch 67 will be closed in the position indicated in FIG. 4. Collector resistors 87, 71 and 83 will be connected to the bus 31 through the reversing switch. The photocells 69, 79 and 93 will thus be in the circuit whereas the photocells 73, 81 and 95 will be out of the circuit.

The operation of the circuit under these conditions will be the same as that experienced in the circuit of FIG. 3. Photocells 69, 79 and 93 will be illuminated in that order so as to open the respective gates in the associated switching stages and to energize windings $W_1$, $W_2$ and then $W_3$.

If counterclockwise rotation is desired, the switch 67 is thrown into the counterclockwise position. This connects the collector resistors 85, 101 and 77 into the circuit, and permits the photocells 73, 81 and 95 to be energized, but precludes the photocells 69, 79 and 93 from becoming energized.

Assume that when power is first applied, the photocells 73 and 81 of stages 35' and 37' are illuminated. The stator under these conditions will be aligned between stator windings $W_1$ and $W_2$. Since the photocell 73 is energized from the darkened stage 39' through the diode 75, full voltage is applied to this photocell and it can drive the transistor 103 towards saturation. The photocell 81 of stage 37', however, can be energized only from stage 35'. The lowered voltage at the collector of the transistor 103 prevents current flow through the photocell 81 and prevents it from driving the transistor 91 into saturation. The gate 89 in the stage 35' is turned on and energizing current flows through winding $W_1$. The gate in the stage 37, however, remains off and winding $W_2$ is not energized. The rotor will commence to rotate in the counterclockwise direction.

As the rotation continues, the sensing means in the stage 39' next becomes illuminated. When the photocell 95 is illuminated, the transistor 97 saturates. Current flow to the photocell 73 is cut-off, terminating the current flow in winding $W_1$ and turning on the gate 99. This energizes winding $W_3$. The operation continues in this fashion. The stage 37' next becomes conductive so that winding $W_2$ is energized.

Thus, the circuit of FIG. 4 operates as a pair of steering circuits in which one or the other of the circuits may be selected so as to produce a desired rotation.

The clockwise circuit described operates in a fashion such that one sensor is inhibited whenever the previous sensor is illuminated. The counterclockwise circuit described operates so that whenever one sensor is illuminated, the previous sensor is cut off. Both methods accomplish essentially the same result. Both methods are used in the bi-directional motor to assure optimum alignment in both directions. The trailing edge of the light beam controls the angle of rotation at which the windings are switched in the clockwise direction. Using the second method, the leading edge of the light beam controls the angle of rotation at which the windings are switched in the counterclockwise direction. Therefore, the switching is controlled by the same edge of the aperture 21 of the shield 19 in both directions of rotation.

Although the steering circuit has been described for use with a Y-connected, three segment brushless D.C. motor, it will be appreciated that the principles of the invention may be applied to motors having any number of poles and any winding configuration.

While the invention has been described in its preferred embodiment, it is to be understood that the words which have been used are words of description rather than limitation and that changes may be made without departing from the true scope and spirit of the invention in its broader aspects.

What is claimed is:

1. An improved steering circuit for a brushless D.C. motor of the type in which a light beam serially traverses individual optical sensing means in a plurality of sensing means and in which a steering circuit is actuated in response to the output of said sensing means so as to energize various stator windings in the cyclical sequence necessary to maintain a desired rotor rotation, said improved steering circuit comprising an individual switching stage corresponding to each stator winding, each of said switching stages being driven by a different one of said individual sensing means and being responsive to an electrical signal from that sensing means to pass energizing current to a different one of said stator windings, said switching stages being arranged in a predetermined order so as to energize individual stator windings in the desired cyclical sequence as successive individual sensing means are illuminated, disabling means intercoupling adjacent stages, said disabling means including means to inhibit the flow of stator winding current through one switching stage while stator winding current is flowing through an adjacent stage in said predetermined order.

2. The apparatus of claim 1 in which each switching stage includes a bistable means responsive to the output of the individual sensing means driving that stage for providing a relatively high voltage when the sensing means is illuminated and a relatively low voltage when the sensing means is dark, and in which said disabling means includes means to inhibit the sensing means in said adjacent stage when said bistable means is in the low voltage state.

3. The apparatus of claim 2 in which each switching stage further includes a gate circuit for controlling the flow of stator winding current, said gate circuit being arranged to be opened or closed when the bistable circuit in the same switching stage is in the high or low voltage state respectively.

4. The apparatus of claim 3 in which each bistable means includes resistance means through which the bistable means is energized and in which said disabling means includes means for energizing the sensing means driving one switching stage through the resistance means in said adjacent stage in said predetermined order.

5. The apparatus of claim 4 in which each of said bistable means includes a saturable preamplifier intercoupling the individual sensing means driving that switching stage and said gate circuit, said preamplifier being normally biased to cut-off.

6. The apparatus of claim 5 in which said preamplifier includes a transistor having base, collector and emitter electrodes, said collector electrode being coupled to a source of energy through said resistance means and in which said disabling means further includes a diode connected between the collector electrode and the sensor driving said adjacent stage in said predetermined order, said diode being oriented so as to draw current through said resistance means in the same direction as the current drawn by said transistor.

7. The apparatus of claim 6 in which said adjacent stage is the following stage.

8. The apparatus of claim 6 in which said adjacent stage is the previous stage.

9. The apparatus of claim 6 in which a clockwise or a counterclockwise cyclical sequence may be selected, said apparatus further including a dual position reversing switch for coupling said transistors to said source of energy, said apparatus further characterized in that each of said individual sensing means includes first and second photocells and in that the resistance means in each switching stage includes first and second resistors coupled to the first and second positions of said dual position reversing switch respectively, said first resistor in each stage being coupled to the first photocell drving the next higher ordered switching stage in the clockwise cyclical sequence, said second resistor being coupled to the second photocell driving the next lower-ordered switching stage in the counterclockwise cyclical sequence.

References Cited

UNITED STATES PATENTS

| | | | |
|---|---|---|---|
| 3,204,165 | 8/1965 | Kreuter | 318—138 |
| 3,374,410 | 3/1968 | Cronquist et al. | 318—138 |
| 3,453,514 | 7/1969 | Rakes et al. | 318—138 |
| 3,508,137 | 4/1970 | Hill | 318—254 |

GLEN R. SIMMONS, Primary Examiner

U.S. Cl. X.R.

318—254